United States Patent
Gordeenko

(10) Patent No.: US 9,592,748 B2
(45) Date of Patent: Mar. 14, 2017

(54) LOCKING DEVICE AND A VEHICLE SEAT

(71) Applicant: Johnson Controls GMBH, Burscheid (DE)

(72) Inventor: Igor Gordeenko, Frechen (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 11 days.

(21) Appl. No.: 14/408,801

(22) PCT Filed: Jun. 11, 2013

(86) PCT No.: PCT/EP2013/062019
§ 371 (c)(1),
(2) Date: Dec. 17, 2014

(87) PCT Pub. No.: WO2013/189781
PCT Pub. Date: Dec. 27, 2013

(65) Prior Publication Data
US 2015/0136934 A1 May 21, 2015

(30) Foreign Application Priority Data

Jun. 18, 2012 (DE) .................. 10 2012 011 951

(51) Int. Cl.
*B60N 2/015* (2006.01)
*B60N 2/36* (2006.01)

(52) U.S. Cl.
CPC ......... *B60N 2/01583* (2013.01); *B60N 2/015* (2013.01); *B60N 2/01508* (2013.01);
(Continued)

(58) Field of Classification Search
CPC ............ B60N 2/01516; B60N 2/01583; B60N 2/01508; B60N 2/01541; B60N 2/366; B60N 2/015
See application file for complete search history.

(56) References Cited

U.S. PATENT DOCUMENTS 6,405,988 B1 * 6/2002 Taylor ................ B60N 2/01516
248/429
9,073,452 B2 * 7/2015 Kamata .............. B60N 2/01516
(Continued)

FOREIGN PATENT DOCUMENTS

DE 3828223 C1 9/1989
DE 3829788 A1 3/1990
(Continued)

OTHER PUBLICATIONS

International Preliminary Report on Patentability for Application No. PCT/EP2013/062019 dated Dec. 31, 2014.
(Continued)

*Primary Examiner* — Eret McNichols
(74) *Attorney, Agent, or Firm* — The Dobrusin Law Firm, P.C.

(57) ABSTRACT

The invention relates to a locking device (1), particularly for a vehicle sent, which comprises a retainer region (5) for receiving a counter element (6), a catch (3) which can be pivoted between a locking position that locks the counter element in said retainer region, and an unlocking position, and a compensation element (9) that can be pivoted between a contact position for tensioning the counter element in the direction of the retainer region and a release position for releasing said counter element.

14 Claims, 2 Drawing Sheets

(52) U.S. Cl.
CPC ..... *B60N 2/01516* (2013.01); *B60N 2/01541* (2013.01); *B60N 2/366* (2013.01); *B60N 2205/20* (2013.01)

(56) References Cited

U.S. PATENT DOCUMENTS

| | | |
|---|---|---|
| 2005/0236862 A1 | 10/2005 | Martone |
| 2015/0041611 A1* | 2/2015 | Mueller ............ B60N 2/01583 248/503.1 |

FOREIGN PATENT DOCUMENTS

| | | |
|---|---|---|
| DE | 4326623 A1 | 2/1995 |
| EP | 2181885 A1 | 5/2010 |
| JP | 2007534542 A | 11/2007 |
| JP | 2011-98585 A | 5/2011 |
| WO | 2005/105512 A2 | 11/2005 |

OTHER PUBLICATIONS

English Translation of International Search Report for Application No. PCT/EP2013/062019, dated Oct. 16, 2013.
German Examination Report dated Apr. 19, 2013 for application No. 10 2012 011 951.8.
Japanese Office Action for Japanese Patent Application No. 2015-517674 dated Feb. 2, 2016.

* cited by examiner

LOCKING DEVICE AND A VEHICLE SEAT

PRIOR ART

The present invention relates to a locking device, particularly for a vehicle seat, which comprises a retainer region for receiving a counter element, a catch which can be pivoted between a locking position that locks the counter element in said retainer region, and an unlocking position.

Such locking devices are generally known. For example, from the publication DE 10 2004 001 766 B3 a locking device for a vehicle seat is known which consists of a housing comprising a ground plane, a swivel-mounted catch arranged in the housing which can be pivoted for locking with a counter element and at least one swivel-mounted retaining element, also mounted in the housing, which, through interaction with the catch, assures a locked state.

The disadvantage of such locking devices is that the catch must be slightly spaced from the counter element to ensure that any manufacturing tolerances cannot adversely affect the locking of the counter element by means of the catch. However, the short distance between the counter element and the catch leads to an increase in noise caused by the intermittent striking of the counter element against the catch as a result of vibrations of the locking device which are caused, for example, by the vehicle travelling along a bumpy road.

DISCLOSURE OF THE INVENTION

The problem underlying the invention is to provide a locking device of the type mentioned above, where the production of interference noise is suppressed, which is also constructed simply and from comparatively few parts, and which allows fast and low-cost manufacture. At the same time, the safe and reliable locking of the counter element in accident situations must be guaranteed.

This problem is solved by means of a locking device, particularly for a vehicle seat, which comprises a retainer region for receiving a counter element, a catch which can be pivoted between a locking position that locks the counter element in said retainer region and an unlocking position, characterised in that the locking device also comprises a compensation element that can be pivoted between a contact position for tensioning the counter element in the direction of the retainer region and a release position for releasing said counter element.

Advantageously, the compensation element comprises a functional surface which, in the contact position, is in positive contact with the counter element, such that the production of interference noise between the catch and the counter element, for example due to vibrations, is suppressed. At the same time, in the event of an accident, the counter element is secured by the catch if the force exerted on the counter element can no longer be retained by the compensation element. An unintentional triggering of the locking device in the event of an accident is therefore prevented. The tolerance limits for the locking device can be increased due to the implementation of the compensation element. Manufacturing costs are considerable reduced in comparison with the prior art. It is conceivable that the locking device for fixing a removable vehicle seat to the floor in the passenger compartment of a motor vehicle in a detachable way is provided. Alternatively, it is also conceivable, of course, that any other vehicle and/or vehicle accessory component can be attached in a reversibly detachable way to structures that are fixed to the body by means of the inventive locking device.

Advantageous configurations and developments of the invention can be extracted from the dependent claims and the description with reference to the drawings.

According to a preferred embodiment of the present invention it is provided that the compensation element comprises a functional surface facing towards the counter element in the contact position, which, in the contact position, exerts a force directed into the retainer region on the counter element. Advantageously, therefore, a movement of the counter element relative to the retainer region is suppressed and so the occurrence of interference noise is prevented. Preferably, therefore, in the contact position the functional surface of the compensation element is in mechanical contact with the counter element, while, in the locking position, the other functional surface of the catch is at a distance from the counter element.

According to a preferred embodiment of the present invention, it is provided that the functional surface is longer than another functional surface of the catch facing towards the counter element in the locking position such that the tolerance area in which the counter element can be is advantageously raised in order to be attached by the compensation element. The functional surface preferably has a concave shape, whereby an arrangement of the counter element, in the area of the functional surface is guaranteed.

According to a preferred embodiment of the present invention, it is provided that the locking device is configured such that the counter element comes into contact with the other functional surface only in the presence of a movement of the counter element, in particular caused by an accident, along a release direction leading out of the retainer region, whereby the other functional surface is aligned in particular perpendicular to the release direction. Advantageously, forces caused by an accident are absorbed by the catch. The compensation element can therefore be scaled down, thereby saving manufacturing costs. The other functional surface is, in particular, aligned at right angles to the release direction such that, in the event of an accident, no force component directed into the locking position affects the catch.

According to a preferred embodiment of the present invention, it is provided that the catch is elastically pre-tensioned in the direction of the locking device by means of a first spring element and the compensation element is elastically pre-tensioned by means of a second spring element in the other second direction beyond the contact position. Advantageously, the second spring element always ensures mechanical contact between the compensation element and the counter element in the contact position. The locking device is therefore, in particular, automatically transferred into the locking and contact position if no release force is exerted on the catch. The use of two separate springs enables, in each case, an optimal closing force to be exerted as the catch and the compensation comprise two different work angles.

According to a preferred embodiment of the present invention, it is provided that a coupling mechanism between the catch and the compensation element is designed in such a way that a movement of the catch from the locking position into the unlocking position causes the compensation element to be transferred from the contact position to the release position. Advantageously, when the catch is transferred from the locking position to the unlocking position, the compensation element is transferred to the release position such that, when the counter element is released, apart from the activation of the catch, no separate activation of the compensation element is necessary. When the catch is transferred from the unlocking position to the locking position, due to the spring force of the second spring element the compensation element pivots back to the contact position. Advantageously, therefore, the compensation element does not need to be actuated individually an any of these cases. The catch simply needs to be used in the customary manner known in the prior art. The coupling mechanism preferably comprises a driver formed on the compensation element which interacts with a control cam formed on the catch.

According to a preferred embodiment of the present invention, it is provided that a first pivot movement of the catch from the locking position in the direction of the unlocking position is essentially aligned parallel to another first pivot movement of the compensation element from the contact position in the direction of the release position and a second pivot movement of the catch from the unlocking position in the direction of the locking position is essentially aligned parallel to another second pivot movement of the compensation element from the release position in the direction of the contact position. The pivot movements of the compensation element and the catch are essentially parallel such that the coupling mechanism can be implemented simply without the need for other moving parts. In addition, space for the catch and the compensation element is needed on just one side of the retainer region and so a more compact construction is achieved. The catch preferably comprises a first jaw which is open on one side for partially encompassing the counter element in the locking position, and the compensation element comprises a second jaw which is open on one side, for partially encompassing the counter element in the active contact position. The first and the second jaw comprise in particular a similar opening direction such that they essentially encompass the counter element from the same side.

According to a preferred embodiment of the present invention, it is provided that the coupling mechanism is designed as a mechanical transmission tool in such a way that the first pivot movement of the catch causes a faster other first pivot movement of the compensation element. This is achieved by the first rotation axis of the compensation element preferably being offset in relation to a second rotation axis of the catch and by the driver sliding over the control cam when the catch is actuated. The first and the second rotation axes are aligned parallel to each other. It is therefore possible for the work angle of the catch to be smaller in comparison to the work angle of the compensation element. The advantage of this is that the functional surface can be comparatively long and, therefore, the reliable prevention of interface noises can be guaranteed without, in return, the reliable release of the counter element being prevented when the catch is actuated.

Furthermore, the subject matter of this invention is a vehicle seat comprising a locking device according to the invention, wherein the locking device, in particular, is used to attach the vehicle seat to a vehicle floor.

Other details, characteristics and advantages of the invention derive from the drawings as well as the following description of preferred embodiments using the drawings. The drawings only illustrate exemplary embodiments of the invention which do not restrict the essential inventive concept.

EMBODIMENTS OF THE INVENTION

Figure 1:
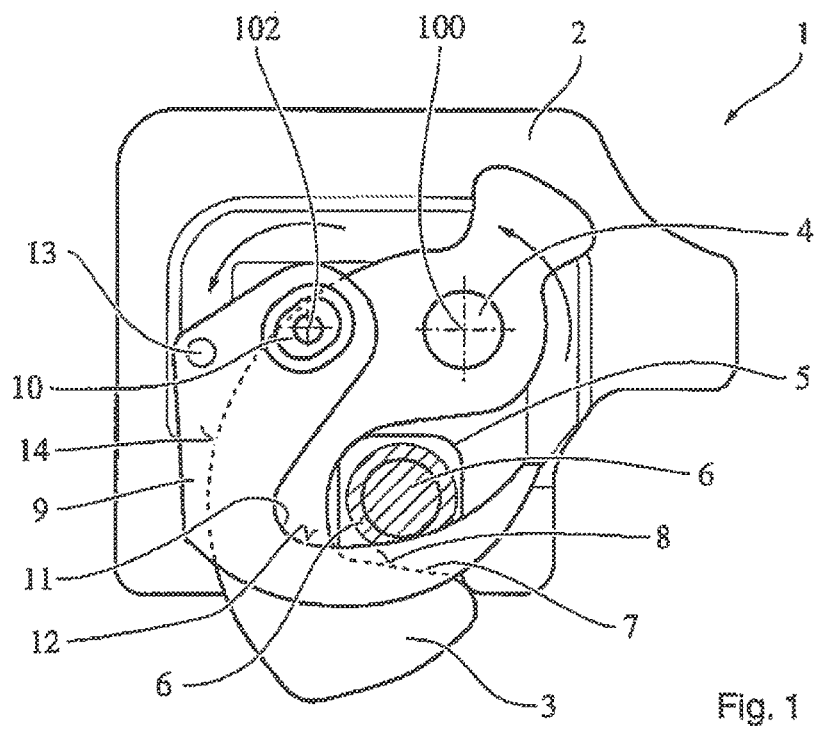
FIG. 1 shows a schematic view of a locking device according to an exemplary embodiment of the present invention, wherein the catch is arranged in the locking position and the compensation element is arranged in the contact position.

In the different figures, the same parts are always provided with the same reference signs and are thus, as a rule, only named or mentioned once.

FIGS. 1 to 5 show a schematic view of the locking device (1) according to an exemplary embodiment of the present invention in different operating states.

The locking device (1) comprises a basic structure (2) in the form of a base plate or a housing, in which a swivel-mounted catch (3) is arranged via a first bearing journal (4). The basic structure (2) also comprises a retainer region (5) shaped like a jaw for receiving a counter element (6). The counter element (6) comprises, for example, a journal which has to be locked in the retainer region (5) by means of the locking device (1). It is conceivable that a vehicle seat or another component of a car is to be reversibly and releasably fixed to the body of the vehicle or in the interior of the vehicle by means of the locking device (1).

Figure 5:
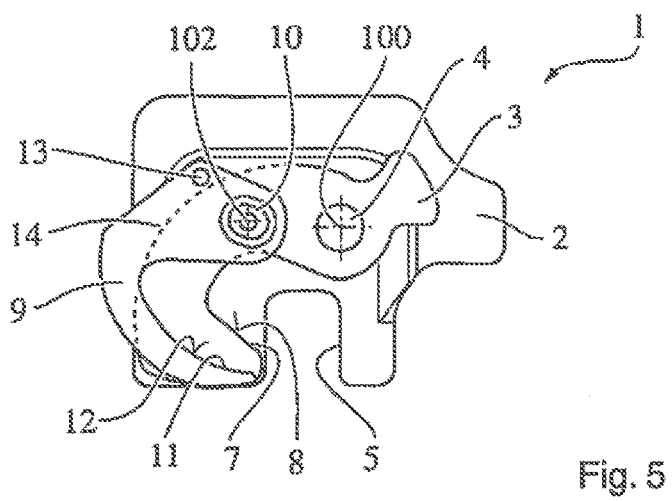
FIG. 5 shows another schematic view of the locking device according to an exemplary embodiment of the present invention, wherein the catch is arranged in the unlocking position and the compensation element is arranged in the release position.

To achieve this, the catch (3) can be pivoted around a first rotation axis (100) and can be pivoted between a locking position in which the counter element (6) is locked in the retainer region (5) by means of the catch (3) (FIG. 1) and a locking position in which the opening of the retainer region (5) is not closed by the catch (3) (FIG. 5). The catch (3) is elastically pre-tensioned by means of a first spring (not shown) along a first direction of rotation in the direction of the locking position. The catch (3) can also be pivoted from the locking position to the unlocking position along a second direction of rotation in the opposite direction to the first direction of rotation by means of an actuation unit (not shown). The actuation unit comprises, for example, a cord attached to the catch (3) which is connected to a handling device to be actuated manually by a user.

Figure 2:
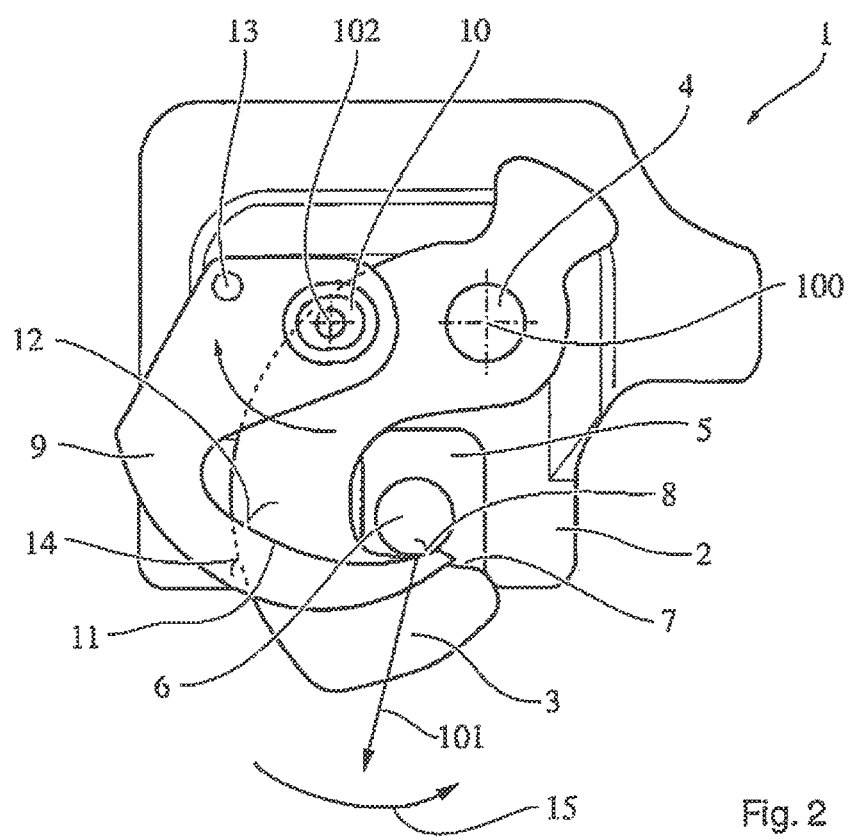
FIG. 2 shows another schematic view of the locking device according to an exemplary embodiment of the present invention, wherein an increased force, caused by an accident for example, is exerted on the counter element in the opening direction.

The catch (3) comprises a first jaw which is open on one side and which, in the locking position, partially encompasses the counter element (6). The catch (3) is, in particular, designed in such a way that, if force is applied to the counter element (6) in the opening direction (101) i.e. outside the retainer region (5), an internal surface (8) of the first jaw (7) is impacted in such a way that, essentially, any resulting torque does not act on the catch (3) (FIG. 2). In the event of an accident, therefore, the counter element (6) is reliably secured in the retainer region (5) by the catch (3). To this end, the internal surface (8) is essentially aligned at right angles to the opening direction (101). An unintentional pivoting of the catch (3) into the unlocking position is therefore prevented.

Figure 3:
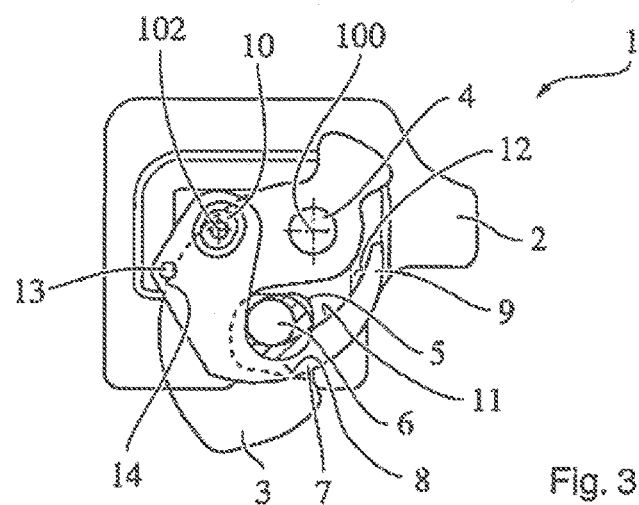
FIG. 3 shows another schematic view of the locking device according to an exemplary embodiment of the present invention, wherein the compensation element is arranged in the active contact position and the catch is fixed by the compensation element in the locking position.
Figure 4:
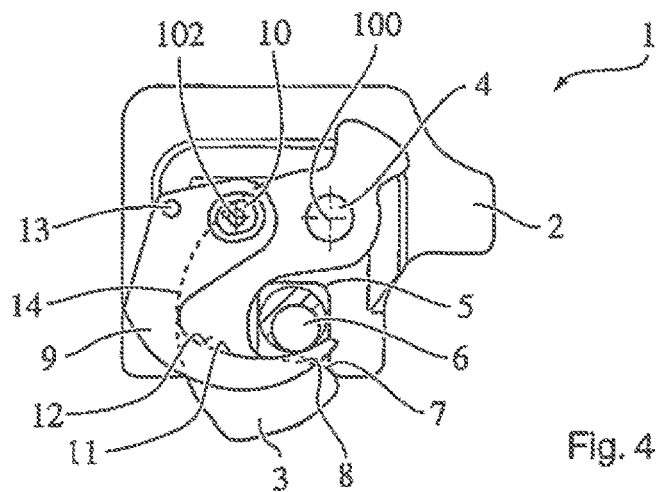
FIG. 4 shows another schematic view of the locking device according to an exemplary embodiment of the present invention, wherein the catch is arranged in the locking position and the compensation element is moved into the release position.

The locking device (1) also comprises a compensation element (9), which is designed to come into positive contact with the counter element (6) in the retainer region (5) (see FIGS. 1 and 3) so that, in the locking position, no interference noise is produced as a result of the repeated striking of the counter element (6) against the catch (3) when the locking device (1) or the counter element (6) vibrates. Another functional surface of the catch (3) facing towards the counter element (6) is therefore arranged at a distance from the counter element (6) in the locking position, provided that no forces caused by an accident are acting. The compensation element (9) is rotatably connected to the basic structure (2) around a second rotation axis (102) by means of a second bearing journal (10). The second rotation axis (102) is aligned parallel to the first rotation axis (100) and is arranged at a distance from the first rotation axis (100) along a direction perpendicular to the opening direction (101). The compensation element (9) comprises a second jaw (11), which is open on one side with an internal i.e. facing towards the counter element (6), functional surface (12). The functional surface (12) has a concave shape. The compensation element (9) can pivot around the second rotation axis (102) along another first direction of rotation which is essentially the same as the first direction of rotation from a release position (FIG. 5) in which the second claw (11) does not project into the retainer region (5) into a contact position (FIG. 1) in which the second claw (111) [sic] is arranged in the retainer region (5) and makes contact with the counter element (6) (FIG. 3). Conversely, the compensation element (9) can be pivoted round the second rotation axis (102) along another second direction of rotation which is essentially the same as the second direction of rotation from the contact position back to the release position (FIG. 4). The compensation element (9) is elastically pre-stressed by means of a second spring (not shown) from the release position in the direction of the contact position and, if necessary, against a counter element (8) arranged in the retainer region (5).

The compensation element (9) is coupled with the catch (3) via a coupling mechanism, the compensation element (9) comprising a driver (13) in the form of a pin, which can slide on an external control cam (14) of the catch (3), if the catch (3) is transferred along the second direction of rotation from the locking position to the unlocking position, for example through actuation of the actuation unit, the control cam (14) comes into contact with the driver (13), causing the compensation element (9) to pivot from the contact position along the other second direction of rotation to the release position (FIG. 5). If the catch (3) pivots back into the locking position, because the actuation unit is no longer actuated for example, the compensation element (9) also automatically pivots back into the contact position due to the second spring. In the contact position, the driver (13) can be out of contact with the control cam (14) (FIG. 1).

If the compensation element (9) is in the contact position and exerts an increased force in the opening direction (101) on the counter element (6), for example due to an accident, the compensation element (9) pivots back and the counter element (6) comes into contact with the other functional surface of the catch (3) (FIG. 2). Due to the rectangular shape of the other functional surface, no torque (15) is exerted on other functional surface through the force action of the counter element (6) (FIG. 2), such that the counter element (6) is fixed by the catch (3) remaining in the locking position (FIG. 2). The forces acting on the counter element (6) are therefore absorbed by the catch (3) and discharged into the basic structure (2) vie the first bearing journal (4).

The illustrated hatched area around the counter element (6) shows in diagrammatic form the permissible tolerance range within which the counter element (6) can be arranged, so that the functional surface (12) of the compensation element (9) can make contact with the counter element (6) and prevent the occurrence of interference noise and, at the same time, the trouble-free transfer of the compensation element (9) from the contact position to the release position is possible.

The work angle of the compensation element (9) is bigger than the work angle of the catch (3), i.e. the compensation element (9) can pivot around the second axle of rotation (102) by a greater angular range than the catch (3) can pivot round the first axle of rotation (100). Through the offset between the first and second axles of rotation (100, 102) the coupling mechanism between the catch (3) and the compensation element (9) acts like a transmission gear unit. If the driver (13) slides on the control cam while the catch (3) is transferred from the locking position to the unlocking position, the compensation element (9) is transferred from the contact position to the release position at greater pivot speed. The free leg of the second claw (11) can therefore be longer than the free leg of the first claw (7) without this adversely affecting the releasing of the counter element (6) from the retainer region (5).

LIST OF REFERENCE SIGNS

1 Locking device
2 Basic structure
3 Catch
4 First bearing journal
5 Retainer region
6 Counter element
7 First claw
8 Inner surface
9 Compensation element
10 Second bearing journal
11 Second claw
12 Functional surface
13 Driver
14 Control cam
15 Torque
100 First axis of rotation
101 Opening direction
102 Second axis of rotation

The invention claimed is:
1. A locking device comprising a retainer region for receiving a counter element, a catch, which can be pivoted between a locking position that locks the counter element in said retainer region and an unlocking position about a first rotation axis, wherein the locking device also comprises a compensation element that can be pivoted between a contact position for tensioning the counter element in a direction of the retainer region and a release position for releasing said counter element about a second rotation axis,
wherein the first rotation axis and the second rotation axis are separate and parallel to each other;
wherein the compensation element comprises a functional surface facing towards the counter element in the contact position, which, in the contact position, exerts a force directed into the retainer region on the counter element;

wherein the locking device is configured such that the counter element comes into contact with an other functional surface of the catch only in the presence of a movement of the counter element along a release direction leading out of the retainer region, whereby the other functional surface of the catch is aligned perpendicular to the release direction;

wherein the compensation element is coupled with the catch via a coupling mechanism, the compensation element comprising driver in the form of a pin, which is configured to slide on an external control cam of the catch;

wherein in case the catch is transferred along a second direction of rotation from the locking position to the unlocking position, the external control cam comes into contact with the driver; and wherein in the contact position of the compensation element the driver is out of contact with the external control cam.

2. The locking device according to claim 1, wherein the functional surface is longer than the other functional surface of the catch facing towards the counter element in the locking position.

3. The locking device according to claim 1, wherein the functional surface has a concave shape.

4. The locking device according to claim 1, wherein, in the contact position, the functional surface of the compensation element is in mechanical contact with the counter element and, in the locking position, the other functional surface of the catch is at a distance from the counter element.

5. The locking device according to claim 1, wherein the catch is elastically pre-tensioned in a direction of the locking device and the compensation element is elastically pre-tensioned in a direction toward the contact position beyond the contact position.

6. The locking device according to claim 1, wherein the coupling mechanism between the catch and the compensation element is designed in such a way that a movement of the catch from the locking position into the unlocking position causes the compensation element to be transferred from the contact position to the release position.

7. The locking device according to claim 6, wherein the coupling mechanism is designed as a mechanical transmission tool in such a way that a first pivot movement of the catch causes a faster other first pivot movement of the compensation element.

8. The locking device according to claim 1, wherein a first pivot movement of the catch from the locking position in the direction of the unlocking position is essentially aligned parallel to another first pivot movement of the compensation element from the contact position in the direction of the release position and a second pivot movement of the catch from the unlocking position in the direction of the locking position is essentially aligned parallel to another second pivot movement of the compensation element from the release position in the direction of the contact position.

9. The locking device according to claim 1, wherein the catch pivots around the first rotation axis by a smaller angular range than the compensation element pivots around the second rotation axis.

10. The locking device according to claim 1, wherein the first rotation axis of the compensation element is offset in relation to the second rotation axis of the catch and the first and the second rotation axes are aligned parallel to each other.

11. The locking device according to claim 1, wherein the catch comprises a first jaw which is open on one side for partially encompassing the counter element in the locking position, and the compensation element comprises a second jaw-which is open on one side, for partially encompassing the counter element in the active contact position.

12. A vehicle seat of a vehicle comprising the locking device of claim 1, wherein the locking device fixes the vehicle seat to a floor of the vehicle.

13. The locking device according to claim 1, wherein the locking device is part of a vehicle seat.

14. The locking device of claim 1, wherein the movement of the counter element is caused by an accident.

* * * * *